Figure 1:
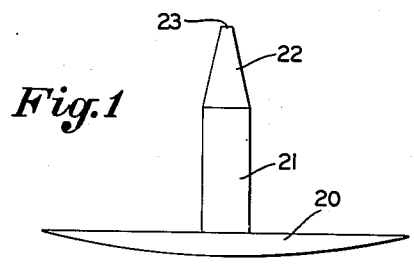

Sept. 11, 1956 — E. W. WALTER — 2,762,413
TIRE PATCH AND METHOD OF MAKING
Filed May 26, 1953 — 2 Sheets-Sheet 1

INVENTOR.
Ernest W. Walter
BY Frease & Bishop
ATTORNEYS

Sept. 11, 1956  E. W. WALTER  2,762,413
TIRE PATCH AND METHOD OF MAKING
Filed May 26, 1953  2 Sheets-Sheet 2

INVENTOR.
Ernest W. Walter
BY
Frease & Bishop
ATTORNEYS

United States Patent Office 2,762,413
Patented Sept. 11, 1956

2,762,413

TIRE PATCH AND METHOD OF MAKING

Ernest W. Walter, Canton, Ohio

Application May 26, 1953, Serial No. 357,557

5 Claims. (Cl. 152—370)

The invention relates to tire patches for tire casings, and has particular reference to a novel form of patch especially adapted for use upon the modern type of tubeless tires.

While such tubeless tires are alleged to be self-sealing in the event of puncture by a nail or other sharp object, such an injury to the tire casing causes a weakness which may result in a blow-out of the tire, due to gravel, sand and other grit, chemicals and water entering the puncture hole and causing the surrounding rubber and cords to rot, producing a slow leak.

In order to overcome this danger, various attempts have been made to patch punctures in such tires, by means of a rubber patch having a stem which is adapted to be located through the hole in the tire.

Great difficulty has been experienced however in inserting the stems of such tire patches through holes in the relatively thick tread of a tire casing, and heretofore there has been no satisfactory method devised for doing the same.

The obvious expedient of enlarging the hole in the tire, to more easily insert the stem of the patch therethrough, does not produce satisfactory results, as it necessarily enlarges the patch and increases danger of a blow-out, or slow leak in tubeless tires.

Various methods have been attempted for inserting the stem of a patch through a hole in a tire casing, none of which have been satisfactory, and it is the object of the present invention to produce a new, easily insertable and highly efficient tire patch; a novel and readily useful tool in the form of a hollow needle or quill, for inserting the stem of the patch through a hole in the tire, which will overcome the disadvantages and difficulties hereinbefore experienced and will generally improve and simplify the method of applying tire patches to tire casings.

Another object of the invention is to provide a tire patch or plug having a stem of soft pliable rubber with a long, tapered end.

A further object is to provide, in combination with such a tire patch, a hollow quill or needle of considerably smaller diameter than the stem of the tire patch, with flexible means therein for attachment to the stem of the tire patch.

A still further object is to provide such a device in which the flexible means for attaching the stem of the tire patch to the hollow quill or needle may be tapes or ribbons formed of rayon, nylon, orlon, woven glass, strip metal or other flexible material having the required strength, and provided with a suitable adhesive coating on their inner surfaces for attachment to the stem of the tire patch.

Another object of the invention is to provide such a device in which the flexible tapes or ribbons are wound around a piano wire or the like of substantially the length of the quill or needle and this assembly is tightly pressed within the hollow quill or needle.

A further object is to provide a new method of forming the assembly of hollow quill or needle with the flexible tapes or ribbons attached thereto.

A still further object is to provide a novel quill or hollow needle for inserting the stem of the tire patch into the puncture hole of the tire casing.

Figures 4, 5, 6, 8:
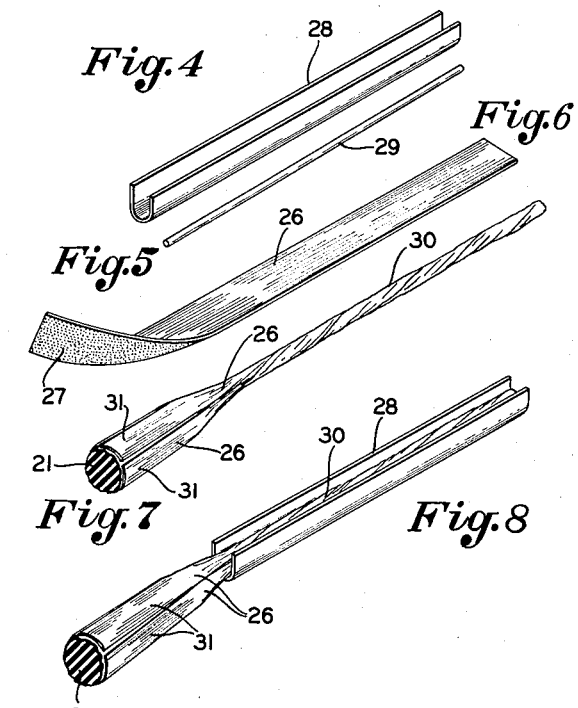
Figure 9:
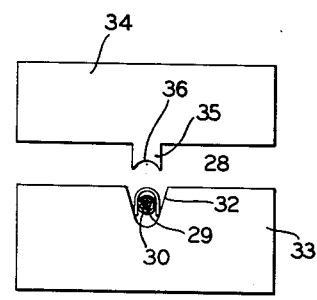
Figure 10:
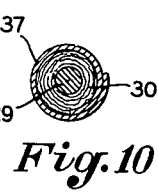
Figure 2:
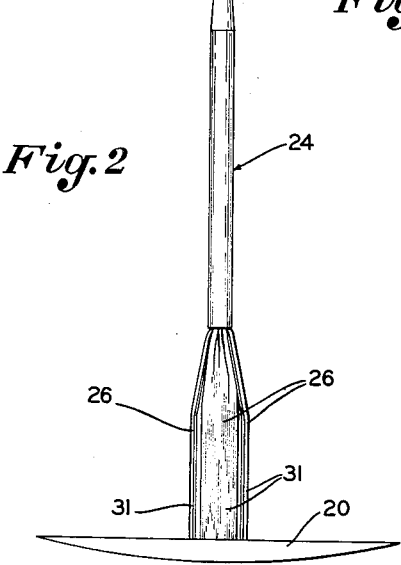
Figures 3, 11:
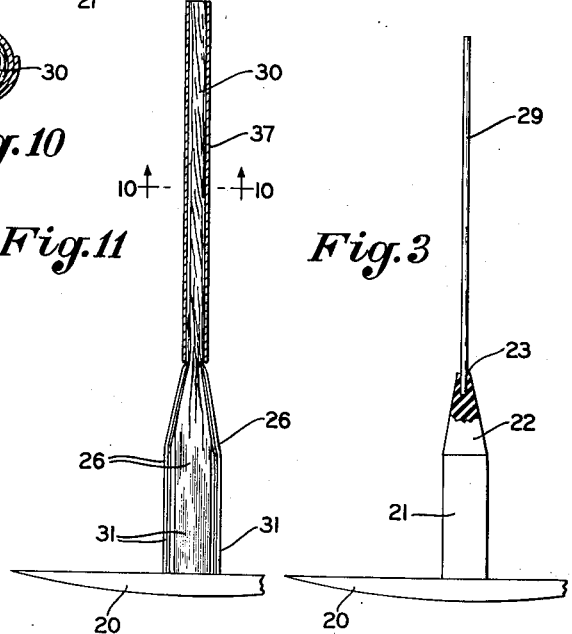
Figure 12:
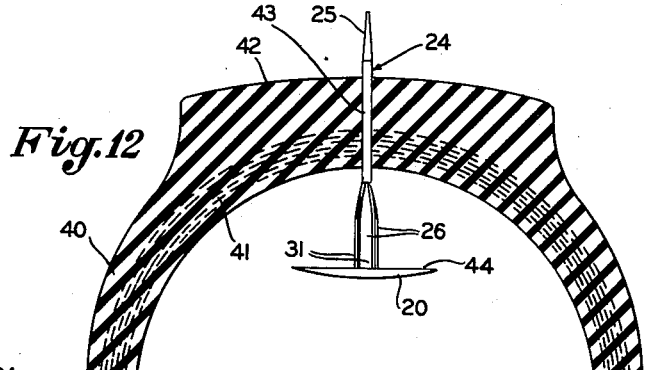
Figure 13:
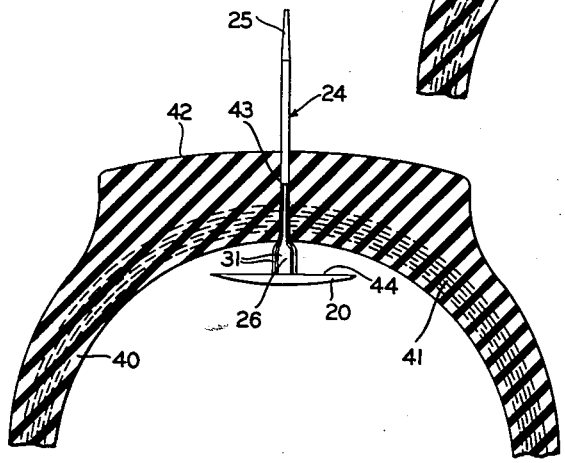
Figure 14:
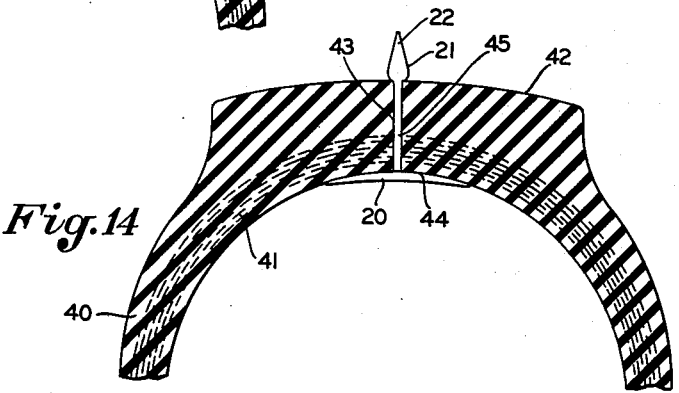
Figure 15:
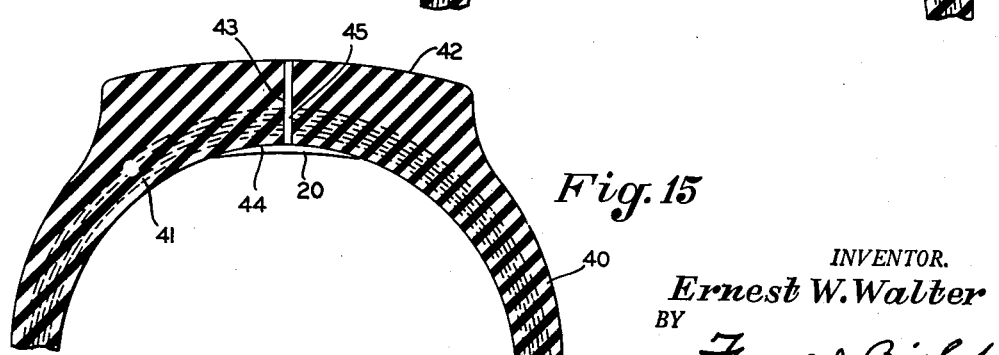

The above objects together with others which will be apparent from the drawings and following description, or which may be later pointed out, may be obtained by constructing the improved tire patch assembly, including the hollow quill or needle and flexible ribbons, in the manner hereinafter described in detail and illustrated in the accompanying drawings, in which:

Fig. 1 is a side elevation of a flexible rubber tire patch forming a part of the invention;

Fig. 2 a side elevation of the complete assembly of tire patch, hollow quill or needle and flexible tapes or ribbons attached to the stem of the tire patch;

Fig. 3 a side elevation of the improved rubber tire patch with the piano wire inserted into the tip end of the stem thereof;

Fig. 4 a detached, perspective view of a substantially channel shape sheet metal member from which the quill or needle is formed;

Fig. 5 a detached, perspective view of the piano wire forming a part of the quill and tape assembly;

Fig. 6 a detached, perspective view of one of the flexible ribbons or tapes;

Fig. 7 a detached, perspective view of the sub-assembly of the flexible members or tapes upon the wire, with the ends thereof attached to the stem of the rubber tire patch;

Fig. 8 a detached, perspective view of the sheet metal channel member from which the quill or needle is formed and the sub-assembly of Fig. 7, showing the wire and flexible tapes or ribbons located therein preparatory to final forming of the quill;

Fig. 9 a side elevation of the dies in which the quill is formed, showing the same in open position with the sheet metal channel member and the assembly of wire and flexible tapes located therein;

Fig. 10 a greatly enlarged, transverse, sectional view through the quill or needle, taken as on the line 10–10, Fig. 11;

Fig. 11 a detached, longitudinal, sectional view of the tire patch, quill, wire and flexible tape assembly, after the same has been formed in the dies of Fig. 9;

Fig. 12 a fragmentary, transverse, sectional view through a tubeless tire casing, showing the manner of inserting the quill through a puncture hole therein;

Fig. 13 a similar view, showing the stem of the tire patch partially drawn through the puncture hole of the tire casing;

Fig. 14 a similar section, showing the stem of the tire patch entirely drawn through the puncture hole with the patch in final position against the inner surface of the tire casing; and, Fig. 15 a similar view, showing the finished tire patch job, with the surplus end of the stem of the tire patch sheared off flush with the outer surface of the tire casing.

Briefly, the invention consists in the provision of a flexible rubber tire patch with tapered stem and a hollow inserting quill or needle formed of sheet metal, or other suitable material, having a tapered outer end and having fastened therein a plurality of flexible tapes or ribbons of rayon, nylon, orlon, woven glass, strip metal, or other suitable material having sufficient strength and flexibility, and protruding from the opposite end of the needle, these tapes or ribbons having on their inner surfaces a coating of rubber cement or other suitable adhesive by which they may be connected to the stem of the tire patch.

The manner of application of the quill to the stem of the tire patch, and the relative diameters thereof, are such that insertion of the quill into the puncture hole in the tire casing will not enlarge the puncture hole, and pulling or drawing action of the quill will elongate the stem of the patch and decrease its diameter so that it may be drawn through the puncture hole and then, when released, the stem of the tire patch will longitudinally shorten and become diametrically enlarged so as to tightly close the puncture, as will be hereinafter described in detail.

In order to accomplish these results, it is important that the quill or needle be of relatively small diameter, preferably not over 1/8 inch, and that it be attached to the tapered stem of the tire patch by flexible means having sufficient strength to permit the stem to be elongated and reduced in diameter as it is pulled through the puncture hole.

This application of the patch to the tire does not put any strain whatever on the rubber stem of the patch, as the flexible ribbons or tapes grip the stem, and as it is pulled through the hole in the tubeless tire or other tire casing, as long as the quill or needle goes through the puncture hole, no matter how small the hole may be, or how tightly it may compress the rubber stem, the ribbons take all of the strain and grip the stem more tightly, so that, when it is quickly pulled entirely through the puncture hole, the ribbons will be pulled away from the protruding end of the stem, and the compressed lower portion of the stem will be held tightly in the hole in the casing.

The improved tire patch is formed of soft or pliable rubber, or the like, and comprises the head 20 and integral stem 21, forming a patch or plug of generally mushroom shape. The outer end portion of the stem is tapered as indicated at 22 in Fig. 1, terminating in the greatly reduced terminal end 23.

It will be understood that the size of the head 20 and the diameter of the stem 21 of the patch or plug may vary for plugging puncture holes in tires of different sizes, although the shape and principle and general proportions of the head and stem of the tire patch will be substantially as shown in the drawings, regardless of the size of the patch.

An important feature of the invention is the quill or hollow needle by means of which the stem of the tire patch is drawn through the puncture hole, and the means for attaching the same to the stem of the tire patch.

This quill or hollow needle is indicated generally at 24, and comprises a tube, of relatively small diameter as compared with the stem 21 of the tire patch, and is provided with a tapered end 25 to facilitate insertion through a puncture hole in a tire, as will be later described in detail.

For the purpose of attaching the quill or needle 24 to the stem 21 of the tire patch, flexible tapes or ribbons 26 are fixed within the tubular quill or needle and provided on their inner surfaces with a suitable adhesive 27 for attachment to the stem.

These tapes or ribbons may be formed of any suitable material having sufficient strength and flexibility and a smooth outer surface, to permit easy drawing of the tire patch stem through a puncture hole. Rayon, nylon, orlon, woven glass, cold rolled metal strip, or similar materials, may be used for the purpose. In actual practice excellent results are obtained with a glassy rayon ribbon.

The manner of constructing the hollow needle or quill and flexible tape or ribbon assembly is illustrated in detail in Figs. 4 to 11 and may be accomplished in the following manner:

A channel member 28, of sheet metal or similar material, of substantially inverted U-shape cross section as shown in Figs. 4 and 8, is first produced, being of a length somewhat less than the length desired in the finished quill or needle.

A substantially rigid member 29, of about the length of the channel member 28 and of much smaller diameter, which may be in the form of a steel wire such as piano wire, is provided for assembling the tapes or ribbons 26 within the quill or needle.

These tapes or ribbons are cut into lengths substantially equal to the combined lengths of the channel member 28 and the stem 21 of the tire patch, and a plurality thereof, preferably four as indicated in the drawings, are used for each assembly of tire patch and quill.

The end portions 31 of the several ribbons are first attached to the stem 21 of the tire patch, by pressing the adhesive surfaces 27 thereof against the stem, and the remaining portions of the ribbons are pressed or wound upon the piano wire 29, as indicated at 30.

The sub-assembly of rubber tire patch, wire and flexible tapes or ribbons shown in Fig. 7 is then assembled with the channel member 28, as shown in Fig. 8, the elongated, rigid portion 30 thereof being located throughout the length of the channel member, the ends 31 of the ribbons, which are attached to the stem 21, protruding from one end thereof.

This assembly shown in Fig. 8 is then inverted and placed in the cavity 32 of the lower die 33, as shown in Fig. 9, and the corresponding upper die 34 is then moved down against the lower die, under about 15 tons pressure, so that the projecting rib 35 thereon, with concave lower edge 36, engages the channel member 28 and forms it into a tube as indicated at 37 in Figs. 10 and 11, tightly clamping the same around the wrapped or twisted portion 30 of the tapes and clamping them tightly around the wire 29 so as to securely bind the same within the tube 37 thus formed.

The partially completed tubular needle or quill 37, as shown in Fig. 11, is then, by another operation, formed into the quill or needle 24 with tapered end 25 as best shown in Fig. 2, by inserting the upper end portion of the tube 37, as viewed in the drawings, in suitable dies to elongate and taper the same as shown at 25.

In Figs. 12 to 15 is shown the manner in which the improved tire patch and quill or needle assembly is used in repairing a puncture hole in a tire. In these figures, a portion of a tubeless tire is indicated at 40, provided with the usual cords 41 and rubber tread portion 42.

Assuming that there is a puncture hole, as indicated at 43, extending through the tread portion of the tire, in order to plug the same, rubber cement or other suitable adhesive is applied to the top surface 44 of the head 20 of the tire patch and to the quill, and the tapered end 25 of the quill or needle 24 is then inserted through the puncture hole 43, from the inside of the tire, as indicated in Fig. 12.

After the tapered end 25 of the quill or needle has passed through the outer end of the puncture hole, as shown in Fig. 12, the same may be grasped, as by a suitable pair of pliers or the like, and pulled upwardly as shown in Fig. 13, compressing the stem of the tire patch and reducing it in diameter as it is drawn upward into the puncture hole 43.

As the pull upon the quill or needle is continued, the entire stem of the patch will be compressed and reduced in diameter and pulled through the puncture hole until the patch assumes the position shown in Fig. 14, the adhesive coated, upper surface 44 of the head of the patch being pulled tightly against the inner wall of the tire while a portion of the stem, which is compressed and reduced in diameter, completely fills the puncture hole 43, as indicated at 45 in Fig. 14, the upper end of the stem 21 being then located above the outside of the tire and expanded to its original diameter as shown in Fig. 14.

The flexible ends 31 of the tapes or ribbons 26 may then be pulled away from the stem leaving the patch as shown in Fig. 14. The protruding upper or outer end of the stem may then be trimmed off substantially flush with the surfaces of the tread, as shown in Fig. 15, and the tire casing is thus properly repaired, the puncture hole being completely sealed by the head of the tire patch cemented to the inner wall of the tire and the remaining portion of the stem 45 expanded so as to tightly fill the puncture hole 43.

It will be evident from the disclosure herein that the tubular needle or quill is securely connected to the stem of the tire patch by means of the flexible tapes or ribbons without in any manner deforming, cutting away or weakening the stem at the point of connection, the connection being made entirely by pressing the adhesive coated surfaces of the tapes or ribbons upon the stem from the tip thereof to the base.

It will also be seen that in this way the most efficient form of frictional contact is made between the quill or needle and the stem of the tire patch.

Also it is evident from the above that, in the initial action of drawing the stem of the tire patch through the puncture hole, the stem is compressed so that its diameter at all points within the puncture hole is approximately the same diameter as the quill or needle, which greatly facilitates the drawing of the stem through the puncture in the tire.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details disclosed.

Having now described the invention or discovery, the construction, the method, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. The method of making a tire patch and inserting quill assembly, which consists in forming a tire patch with a head and an elastic stem tapered toward its outer end, providing a channel shape sheet metal member, providing a substantially rigid member of substantially the length of the channel member and of relatively smaller diameter, providing a plurality of ribbons of strong flexible material with a smooth outer surface of a length substantially equal to the combined lengths of the channel member and the stem of the tire patch, coating one surface of the flexible ribbons with an adhesive, wrapping one end portion of each of the flexible ribbons around the rigid member and leaving the other end portions of the ribbons extending therebeyond, placing the wrapped rigid member within the channel member, forming the channel member into a tubular quill, tightly clamping the wrapped rigid member therein with the flexible end portions of the ribbons extending from one end of the quill, and attaching the adhesive coated surface of said flexible end portions of the ribbons longitudinally to the stem of the tire patch throughout its length whereby the ribbons form a smooth cover upon the stem.

2. The method of making a tire patch and inserting quill assembly, which consists in forming a tire patch with a head and an elastic stem tapered toward its outer end, providing a channel shape sheet metal member, providing a substantially rigid member of substantially the length of the channel member and of relatively smaller diameter, providing a plurality of ribbons of strong flexible material with a smooth outer surface of a length substantially equal to the combined lengths of the channel member and the stem of the tire patch, coating one surface of the flexible ribbons with an adhesive, wrapping one end portion of each of the flexible ribbons around the rigid member and leaving the other end portions of the ribbons extending therebeyond, placing the wrapped rigid member within the channel member, forming the channel member into a tubular quill, tightly clamping the wrapped rigid member therein with the flexible end portions of the ribbons extending from one end of the quill, tapering the other end of the tubular quill, and attaching the adhesive coated surfaces of said flexible end portions of the ribbons longitudinally to the stem of the tire patch throughout its length whereby the ribbons form a smooth cover upon the stem.

3. The method of making a tire patch and inserting quill assembly, which consists in forming a tire patch with a head and an elastic stem tapered toward its outer end, providing a channel shape sheet metal member, providing a substantially rigid member of substantially the length of the channel member and of relatively smaller diameter, providing a plurality of flexible ribbons of glassy rayon, of a length substantially equal to the combined lengths of the channel member and the stem of the tire patch, coating one surface of the flexible ribbons with an adhesive, wrapping one end portion of each of the flexible ribbons around the rigid member and leaving the other end portions of the ribbons extending therebeyond, placing the wrapped rigid member within the channel member, forming the channel member into a tubular quill, tightly clamping the wrapped rigid member therein with the flexible end portion of the ribbon extending from one end of the quill, and attaching the adhesive coated surface of said flexible end portions of the ribbons longitudinally to the stem of the tire patch throughout its length whereby the ribbons form a smooth cover upon the stem.

4. A tire patch comprising a head and an elastic stem, a substantially rigid tubular inserting quill applied to the outer end of the stem and having a tapered outer end, a straight, substantially rigid wire located within and substantially coextensive with the quill, a plurality of ribbons of strong flexible material with a smooth outer surface, said ribbons being of a length equal to the combined lengths of the quill and the stem of the patch and being wound upon the wire and tightly clamped within the quill, the end portions of the ribbons extending from the attaching end of the quill, said extending end portions of the ribbons being straight and extending longitudinally of the stem throughout its length, and adhesive connecting the innert surfaces of said extending end portions to the stem throughout its length, whereby said extending end portions of the ribbons form a smooth cover entirely around the stem throughout its length and conforming to the contour thereof.

5. A tire patch comprising a head and an elastic stem, a substantially rigid tubular inserting quill applied to the outer end of the stem and having a tapered outer end, a straight, substantially rigid wire located within and substantially coextensive with the quill, a plurality of glassy rayon ribbons with a smooth outer surface, said ribbons being of a length equal to the combined lengths of the quill and the stem of the patch and being wound upon the wire and tightly clamped within the quill, the end portions of the ribbons extending from the attaching end of the quill, said extending end portions of the ribbons being straight and extending longitudinally of the stem throughout its length, and adhesive connecting the inner surfaces of said extending end portions to the stem throughout its length, whereby said extending end portions of the ribbons form a smooth cover entirely around the stem throughout its length and conforming to the contour thereof.

References Cited in the file of this patent

UNITED STATES PATENTS

| Number | Name | Date |
| --- | --- | --- |
| 1,653,499 | Fisher | Dec. 20, 1927 |
| 1,670,242 | Cook | May 15, 1928 |
| 1,833,194 | Young | Nov. 24, 1931 |
| 1,897,028 | Anderson | Feb. 14, 1933 |
| 2,293,374 | Wesseler | Aug. 18, 1942 |